United States Patent
Lambert et al.

(10) Patent No.: US 12,306,784 B2
(45) Date of Patent: May 20, 2025

(54) SYSTEMS AND METHODS FOR CONDITIONAL ENABLEMENT AND HOST VISIBILITY FOR HOT-ADDABLE AND HOT-PLUGGABLE DEVICES

(71) Applicant: DELL PRODUCTS L.P., Round Rock, TX (US)

(72) Inventors: Timothy M. Lambert, Austin, TX (US); Jeffrey L. Kennedy, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 254 days.

(21) Appl. No.: 17/862,284

(22) Filed: Jul. 11, 2022

(65) Prior Publication Data

US 2024/0012779 A1  Jan. 11, 2024

(51) Int. Cl.
*G06F 13/40* (2006.01)
*G06F 9/4401* (2018.01)

(52) U.S. Cl.
CPC ........ *G06F 13/4081* (2013.01); *G06F 9/4411* (2013.01)

(58) Field of Classification Search
None
See application file for complete search history.

(56) References Cited

U.S. PATENT DOCUMENTS

| 11,409,686 | B1 | 8/2022 | Lambert et al. | |
|---|---|---|---|---|
| 11,514,195 | B2 | 11/2022 | Kennedy | |
| 2002/0129186 | A1* | 9/2002 | Emerson | G06F 13/4081 710/302 |
| 2012/0072633 | A1* | 3/2012 | Elboim | G06F 13/4081 710/302 |
| 2017/0242686 | A1* | 8/2017 | Vidyadhara | G06F 8/656 |
| 2018/0095904 | A1* | 4/2018 | Bunker | G06F 13/102 |
| 2023/0025979 | A1* | 1/2023 | Bolen | G06F 21/44 |

OTHER PUBLICATIONS

Debendra Das Sharma, Robert Blankenship, and Daniel Berger. 2024. An Introduction to the Compute Express Link (CXL) Interconnect. ACM Comput. Surv. 56, 11, Article 290 (Nov. 2024), 37 pages. https://doi.org/10.1145/3669900 (Year: 2024).*

Kristiansen, Lars Bjørlykke. PCIe Device Lending. Master thesis, University of Oslo, 2015. 18 pages. http://hdl.handle.net/10852/44802 (Year: 2015).*

A. Bolen et al., "PCIe Hot-Plug and Error Handling for NVMe 2019 NVMe™ Annual Members Meeting and Developer Day," nvm EXPRESS Architected Performance, Mar. 19, 2019. (25pgs).

* cited by examiner

*Primary Examiner* — Farley Abad
*Assistant Examiner* — Dayton Lewis-Taylor
(74) *Attorney, Agent, or Firm* — BAUGH LAW, LLC (57) ABSTRACT

Presented herein are systems and methods for the orchestrated secure attestation and conditional enablement of a hot-plug peripheral device. In one or more embodiments, a newly added peripheral device is initially set to a hidden status so that it is not visible to the host operation system of the information handling system. In one or more embodiments, only after being successfully vetted is the peripheral device made visible to the host. In one or more embodiments, if the peripheral device is not supported, including failing one or more policies, the peripheral device remains in a hidden state to the host operating system of the information handling system.

20 Claims, 9 Drawing Sheets

SYSTEMS AND METHODS FOR CONDITIONAL ENABLEMENT AND HOST VISIBILITY FOR HOT-ADDABLE AND HOT-PLUGGABLE DEVICES

BACKGROUND

A. Technical Field

The present disclosure relates generally to information handling systems. More particularly, the present disclosure relates to addition and removal of peripheral devices to an information handling system.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Often, information handling systems include one or more connectors for attaching peripheral devices. Peripheral devices provide an array of benefits, including allowing systems to increase resources (e.g., memory, power, etc.), increase functionality by adding components (e.g., cards), devices (e.g., cameras, tablets, keyboards, mice, etc.), and connections (e.g., support for wired and/or wireless connections). Connectors are typically built into systems (or may be added to systems) to make the addition/removal of peripheral device convenient for users. The types of connectors on a system may vary for a number of reasons, such as the expected usage of the system, build configurations, standards, common connector types, etc.

Regardless of the connector types or even the systems, users generally demand that these systems be made as easy and convenient for users as possible. Thus, hot-add features and hot-plug features have been developed to make the addition and/or the removal of peripheral devices while a system is running easier and more convenient for the user. Both of these handling types are automated as much as possible so that the addition or removal of the peripheral device requires as little involvement of the user as possible.

Hot-add functionality allows a device to be connected to the system, even when it is running; however, due to the nature of the peripheral device and/or the system, the peripheral device cannot be made available to the information handling system until after a power cycle (i.e., the system is turned off and then back on). Such situations may arise due to technology issues (e.g., older versions of software and/or firmware), requirements to update files, registries, drivers, libraries, or firmware that cannot be done while the system is operational, or other reasons. In any event, a restart of the information handling system, which requires minimal user skill or input, with the newly added peripheral device connected to the information handling system results in the peripheral device addition to the information handling system as a functional element. Often, removal of a hot-add peripheral device does not require restart of the information handling system.

In contrast to hot-addable peripheral devices, hot-pluggable peripheral devices can be added and made available to the information handling system while it is operational and does not require a restart. Such a feature is highly desirable for at least three reasons. First, it requires no user intervention beyond connecting the new peripheral device. Second, it makes the functionality of the new peripheral device available almost immediately. And third, restarting the information handling system interrupts other processes—even those that are unrelated to the new peripheral device—because the entire system must power cycle. For critical systems, such as network switches, storage systems, firewalls, access devices, etc., having to power cycle the device can be very disruptive to a vast number of users and/or services.

While hot-add and hot-plug features make handling of peripheral device easier and more convenient, the ease and convenience is not always beneficial. In trying to reduce the complexity, certain key elements may not receive proper attention. For example, security aspects may not be properly addressed. Thus, the addition of a peripheral device may result in compromise of the information handling system or even of a network. Also, as hot-add/hot-plug expands to more complex systems, additional factors beyond just software support may need to be considered (e.g., power, thermal, etc.).

Accordingly, it is highly desirable to find new and better systems and methods for handling the addition of peripheral device to information handling systems.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of certain protocols, connection types, and systems, aspects of the present disclosure are not so limited. Accordingly, the aspects of the present disclosure may be applied or adapted for use in other contexts where a peripheral device may be connected to an information handling system.

A. General Introduction

Hot-add and hot-plug functionality and the orderly or surprise removal of a peripheral device while an information handling system is on (i.e., operating) has become increasingly popular and promotes information handling system uptime. The scope of device types that require these user operations in a mainstream system is expanding beyond computers and laptops to very complex devices and systems found in datacenters, networking operations, and the like. Support for hot-add and/or hot-plug can be found in networking devices, storage devices, security device, and many other devices.

It must be noted, however, that support for hot-add and hot-plug in these systems can be more involved. Consider the following example. Open Compute Platform (OCP) network interface cards (NICs) are becoming more prevalent and have a wide range of power and thermal requirements. An OCP slot within the system may physically accommodate an OCP NIC, but the NIC may have cooling requirements that are beyond what the system can deliver. The OCP 3.0 Mezz specification indicates the electrical requirements for hot-plug, but it currently does not define any system management, host BIOS (basic input output system), or requirements for other layers that would be required to be implemented by the system developer and partners.

Additionally, the OCP 3.0 PRESENCE bits are ambiguous in some cases. The PRESENCE bit combinations indicate to the host and/or BIOS what the requested bifurcation of links is. However, the number of links that are expected to be trained must be queried through another sideband communication method. For example, PRSNTB[3:0]

=1101b indicates 1×8 (Small Form Factor 2C+) or 2×8 (Small Form Factor 4C+), which is ambiguous. The form factor is transparent and not discoverable by any automated method. The host/BIOS must be notified whether to expect one or two links to determine if a failure to train a second x8 partner is expected or not. It must be noted that other factors may also not be properly addressed or handled. One critical factor is security. Security concerns must be paramount for critical infrastructure like networks and datacenters. However, hot-add and hot-plug features may not properly address security. These features make the peripheral device aware of the host/BIOS immediately, even if it is not yet functional. However, the process of being made aware to the host/BIOS may be sufficient to cause a critical security breach.

Accordingly, disclosed herein are embodiments of systems and methods for system management and enablement of peripheral devices while increasing server uptime, improving security, and improving the customer experience.

It shall be noted that embodiments disclosed herein present a number of novel aspects; some of these aspects include (but are not limited to) the following. In one or more embodiments, a baseboard management controller (BMC) gates host visibility of an added peripheral device—the BMC does not allow unsupported/unauthenticated services to be visible to the host, which provides added security and reduces resources usage. Furthermore, in one or more embodiments, the BMC may distinguish between hot-pluggable versus hot-addable peripheral device and cause the appropriate processing to take place to get the platforms to support the new peripheral device. Note that hot-add functionality allows a peripheral device to be connected to an information handling system when it is running, but the peripheral device is not available to the information handling system until after a power cycle (i.e., the system is turned off and then back on). That is, a hot-add peripheral device is a device that can be connected to an information handling system while it is operating and that at least some electrical support is provided but no management/host support is provided to the peripheral device until after a power cycle. In contrast to hot-addable peripheral devices, hot-pluggable peripheral devices can be added and made available to the information handling system while it is operational and does not require a restart. Traditionally, related features have been controlled autonomously by hardware mechanisms without any system management firmware orchestration or attestation. Having a hardware only implementation may limit deployment (since specialized hardware is needed), can be complex, and can limit scaling.

It shall be noted that other features or benefits may be achieved by embodiments. For example, the BMC may communicate additional device purposing and bifurcation requirements that may be ambiguous to the host BIOS.

It shall also be noted that embodiments may be widely deployed for use with a vast array of information handling system that have connectors for peripheral devices. One example deployment may be a server, but deployments may range to other devices such as (by way of illustration only) networking information handling system (e.g., 16G rack and tower that support hot-add/plug of a PCIe device (e.g., OCP 3.0 NIC, NVMe® Storage)).

B. Embodiments of Systems and Methods

Figure 1:
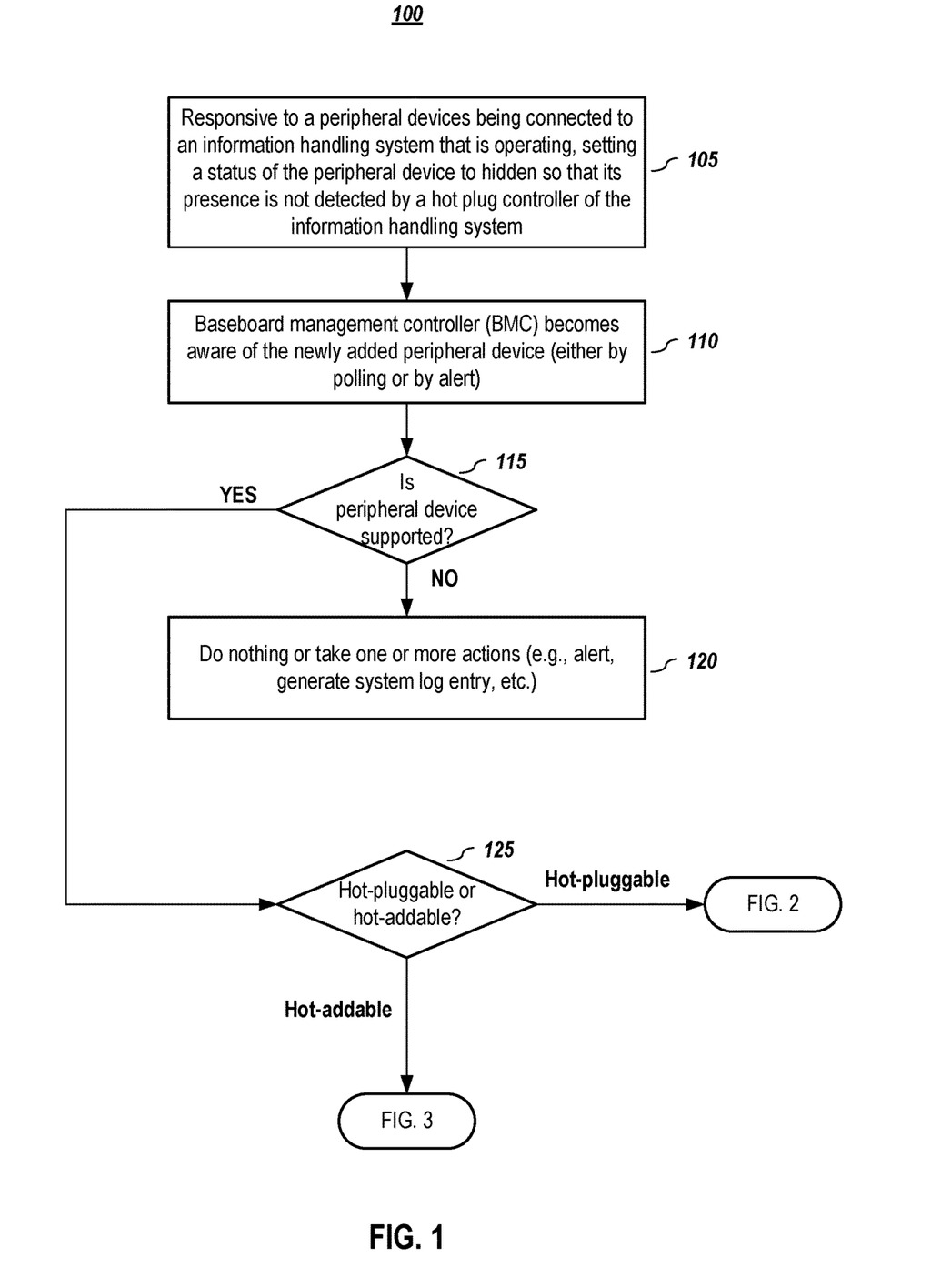
FIGS. 1-3 depict methods for handling the addition of a peripheral device to an information handling system that is operating, according to embodiments of the present disclosure.
Figure 2:
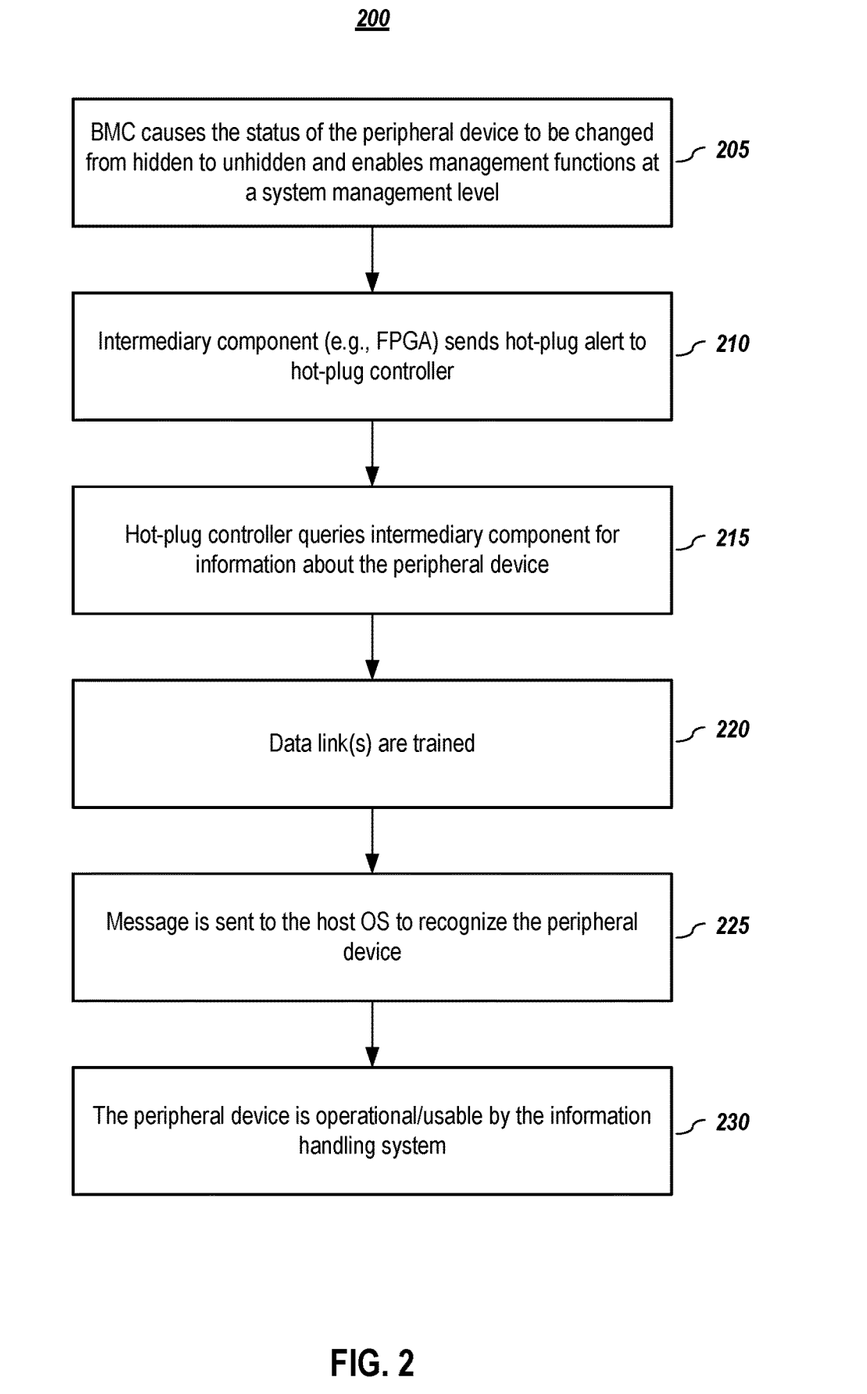
Figure 3:
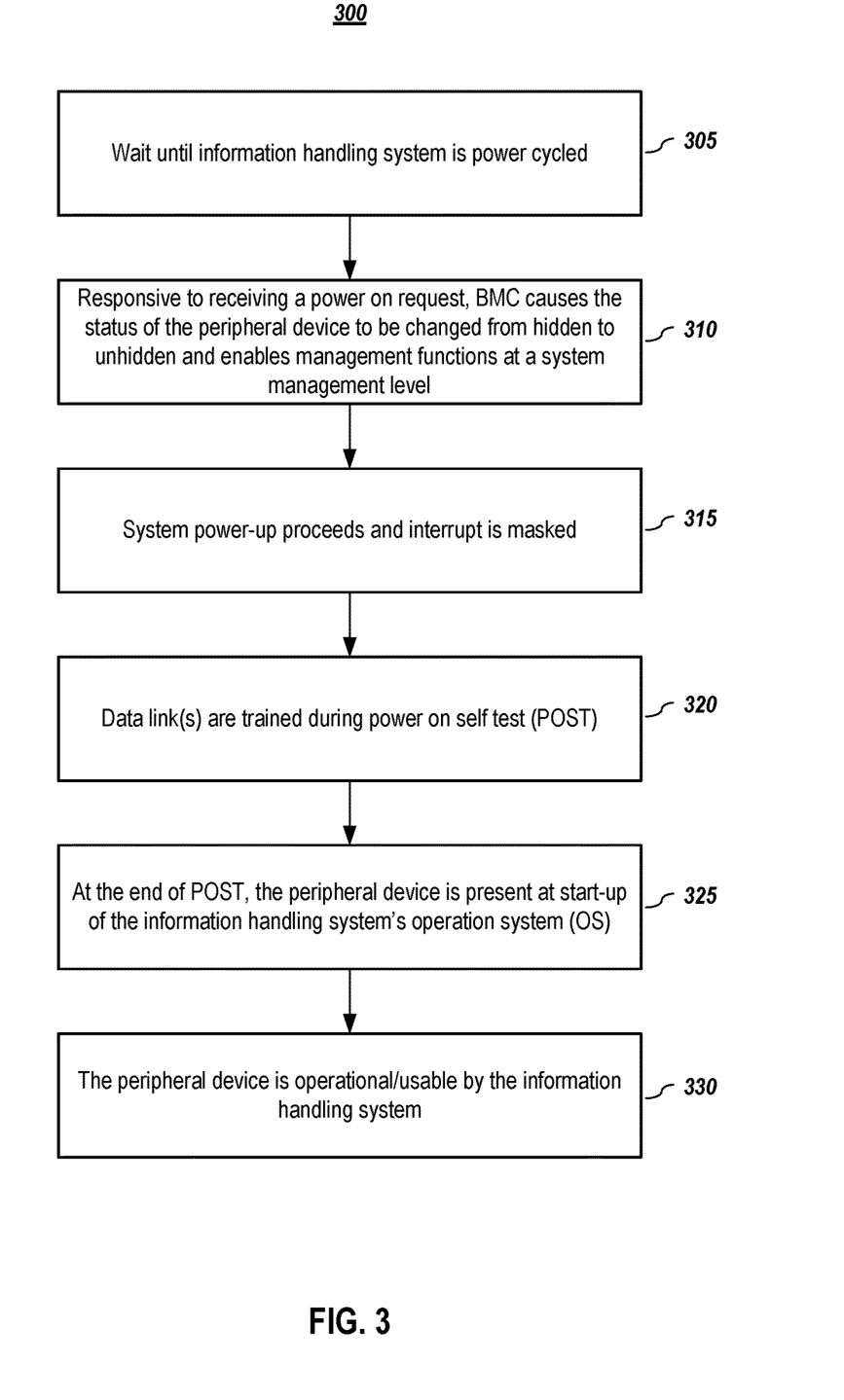
Figure 4:
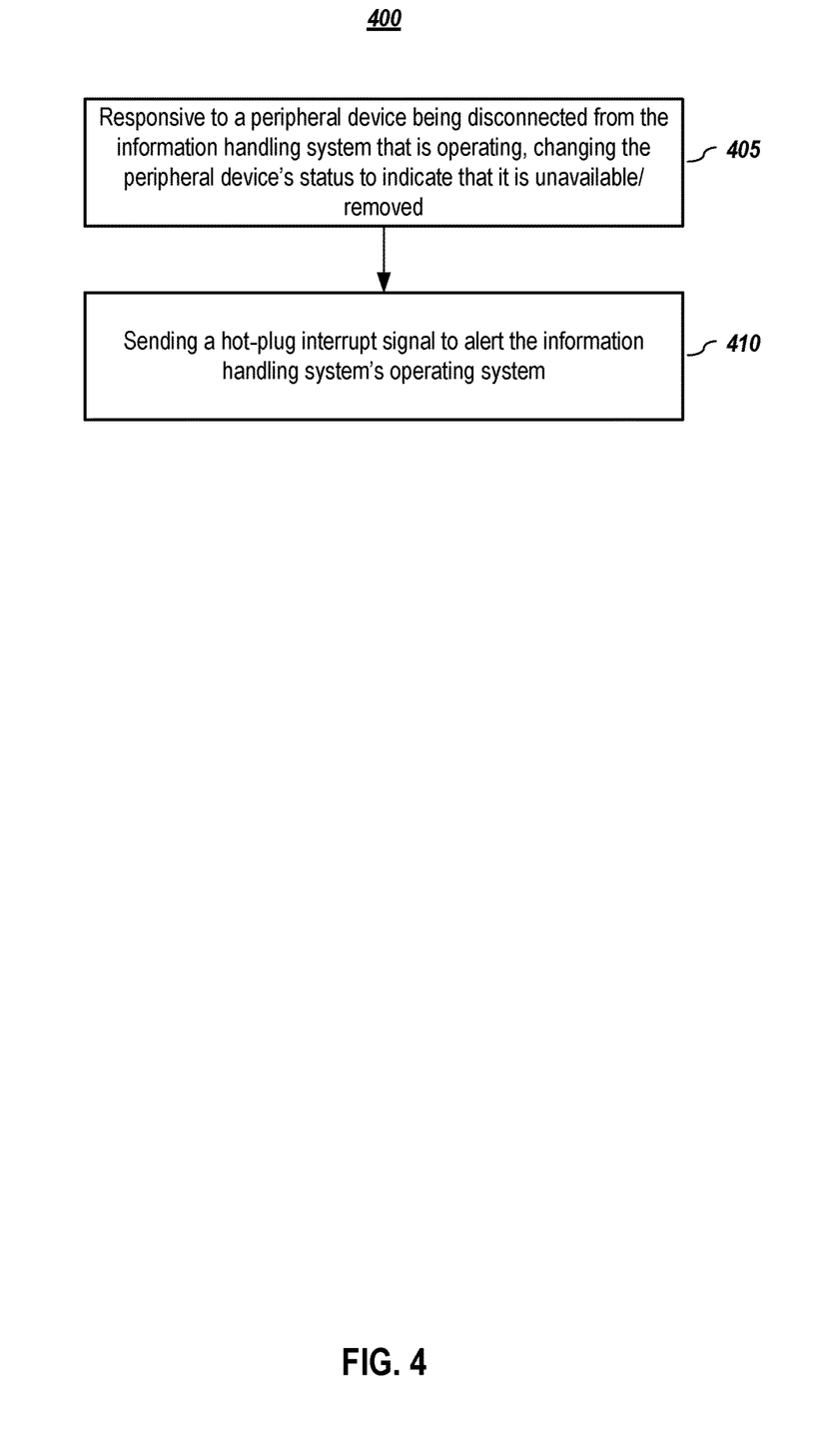
FIG. 4 depicts a methodology for handling the removal of a peripheral device from an information handling system, according to embodiments of the present disclosure.

FIGS. 1-3 depict methods for handling the addition of a peripheral device to an information handling system, according to embodiments of the present disclosure. FIG. 4 depicts a methodology for handling the removal of a peripheral device from an information handling system, according to embodiments of the present disclosure. FIGS. 5-9 depict example system embodiments that may be used to implement the methods of FIGS. 1-3 and FIG. 4; however, it shall be noted that system embodiments of FIGS. 5-9 are provided by way of illustration. Different types of configurations, protocols, connection types, implementations, and connections may be used and shall be considered to fall within the scope of the current patent documents.

1. Initial Support Checking Embodiments

FIG. 1 commences following the addition of a peripheral device to a system. To aid illustration of the methodologies, consider the example storage system 500 depicted in FIG. 5. The depicted system 500 comprises a planar system 505 that is communicatively coupled via link 525 with a backplane 530, which comprises a number of connectors for attaching solid state drive (SSD) storage devices, such as non-volatile memory express (NVMe®) storage. It shall be noted that the system 500 depicted in FIG. 5 may represent a subsystem of a larger system that comprises addition components (e.g., one or more processors, one or more memories, one or more additional connectors, one or more input/output device, etc.).

In the depicted example, three SSDs 535 are currently connected and operating (SSD1, SSD2, and SSD3), and a new peripheral device, SSD4 535-4, is added. In one or more embodiments, the addition of new peripheral device 535-4 to the system causes a signal to be sent to the planar system 505. Typically, the signal would be received by a host hot-plug controller 520, which would start the process to try to add the peripheral device to the overall system 500. However, as depicted in the embodiment in FIG. 5, the signal (which may be an in-band or out-of-band (OOB) signal) sent on link 525 is intercepted or received by an intermediary component 515. Responsive to the peripheral device being connected to the information handling system that is operating and the signal detected by the intermediary component 515, the intermediary component 515 sets (105) a status of the peripheral device to "hidden" so that its presence is not detected by the hot-plug controller 520 of the information handling system. It shall be noted that the term "hidden" may be used to mean, for a host operation system, "not present" and "unhidden" to mean "present." In one or more embodiments, the existence of the peripheral device and its status may be stored in a register or other memory that is maintained or accessible by the intermediary component 515.

In one or more embodiments, a baseboard management controller (BMC) 510 is made aware/recognizes (110) that a new peripheral device has been being connected to the information handling system 500. The BMC 510 may be made aware of the existence of the new peripheral device by either the intermediary component 515 sending an alert to the BMC 510 or by the BMC polling the intermediary component 515 for a listing of newly added peripheral devices since the last time it polled the intermediary component.

In one or more embodiments, the BMC uses a set of policies (i.e., one or more policies) to determine whether the newly added peripheral device is supported by the information handling system. These policies may include aspects such as security (e.g., authentication, trust, etc.), peripheral device model/type, one or more resource requirements (thermal, power, processing, etc.), etc. For example, some of the policies (which are included by way of illustration and not limitation) that may be considered to determine whether a peripheral device is supported may include (but are not limited to): determining whether the peripheral device's firmware passed attestation, power needs discovered and budgeted, insuring that the peripheral device's firmware successfully auto-updated before exposure to the host domain, policies set-up (e.g., the appropriate link subdivision/bifurcation has occurred), setting the clocking method, executing commands to limit the training speed if the electrical channel for a specific part may not be optimal to allow maximum speed negotiation, insuring that the peripheral device a specific part or manufacturer disallowance, etc. The services or policies listed in this paragraph, listed in subsequent embodiments starting in the next section, and listed in claim 9 may be provided or included. A user of the system, a developer of the system, or both may set the policies, which may be updated from time to time.

Figure 5:
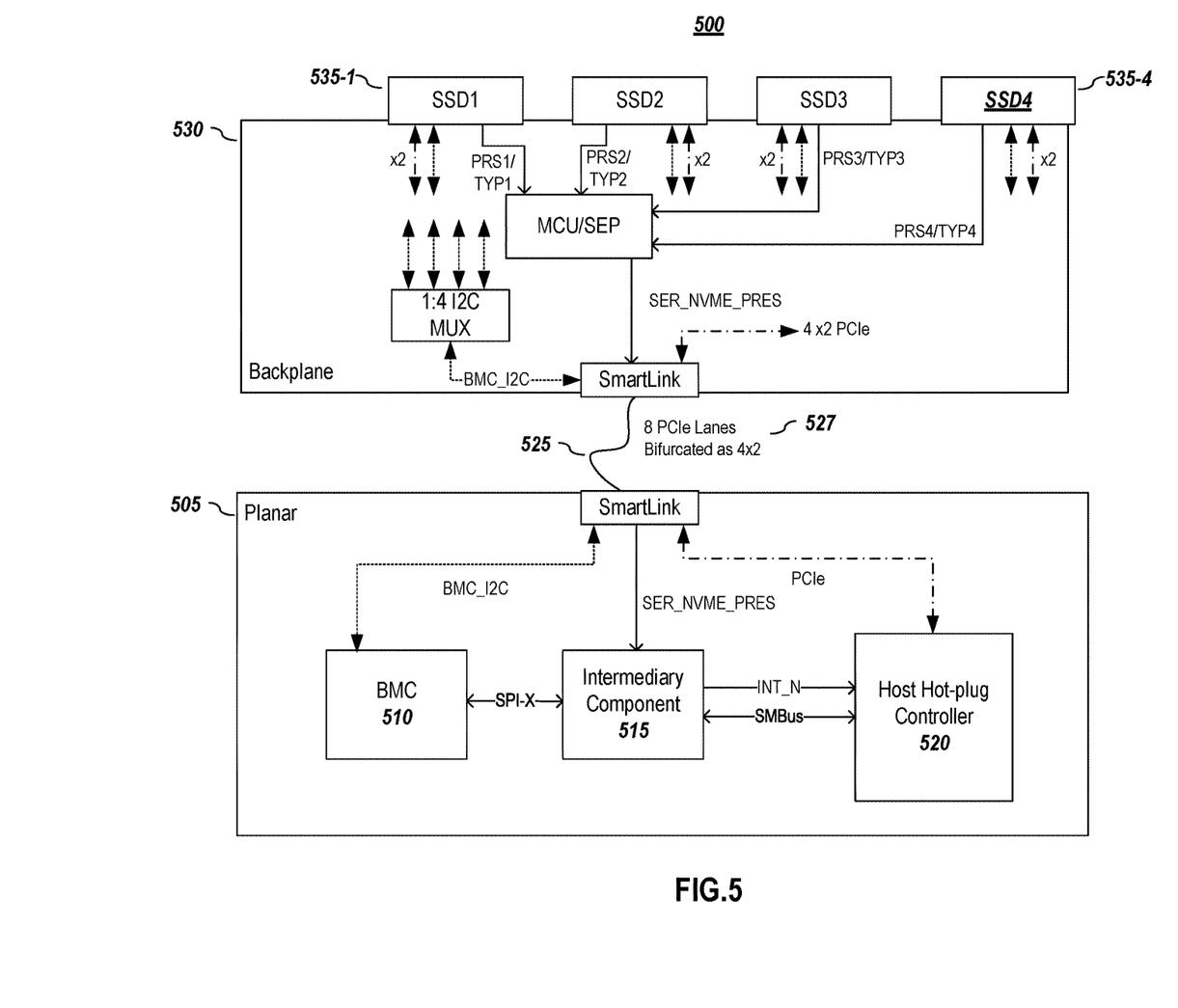
FIG. 5 depicts an example system embodiment that may be used to implement methods for handling addition/removal of a peripheral device, such as the methods of FIGS. 1-4, according to embodiments of the present disclosure.

If the peripheral device is not supported (e.g., it fails one or more of the policies), the peripheral device remains in a hidden state (i.e., nothing is done to change its status) and it is not managed. In this way, the host level of the system 500 was never aware of the peripheral device. Attestation of the peripheral device to the BMC before use by the host domain may be preferred in some situation in comparison to the current approach of attaching to the host domain and then attest OOB after the fact. One such case is for NVMe® drives, which do not have the same local secure boot sophistication as Smart NICs.

In one or more embodiments, no additional action may be taken; or alternatively, one or more actions may be taken (120). For example, the BMC may cause that: (1) a system event log entry is made to record that an unsupported peripheral device was added; (2) an administrator or other user is alerted; (3) an indicator (e.g., a light) is triggered to indicate that the peripheral device is not supported, etc.

In response to the BMC determining that the peripheral device is supported, the BMC may also determine whether the peripheral device is hot-pluggable or hot-addable. Depending upon whether the supported peripheral device is hot-pluggable or hot-addable, the BMC may cause different methods to be performed. FIG. 2 depicts a methodology 200 for hot-pluggable peripheral devices, according to embodiments of the present disclosure, and FIG. 3 depicts a methodology 300 for hot-add peripheral devices, according to embodiments of the present disclosure.

2. Hot-Pluggable Embodiments

Turning now to FIG. 2, responsive to the peripheral device being determined by the BMC 510 to be supported and hot-pluggable, the BMC causes (205) the status of the peripheral device to be changed from hidden to unhidden. In one or more embodiments, the BMC may cause (205) the status of the peripheral device to be changed by signaling the intermediary component 515 to change a register from indicating that the peripheral device is hidden to unhidden. As depicted in the embodiment in FIG. 2, the BMC may also enable management functions of the peripheral device at a system management level, such as power, thermal, etc. In one or more embodiments, there may be overlap between the enabling of management functions and checking of policies to determine if the peripheral device is supported. It shall be noted that BMC involvement before the host domain is notified of the attach event adds significant value because it allows for the handling of such items including (but not limited to): power budgeting/allocation (new form factors are increasing their main and auxiliary (AUX) budgets with more density leading to more aggregate power needs), device firmware (FW) update, OOB FW recovery (e.g., if attestation, update, or discovery fails), OOB handshake for selective link subdivision, set-up of alternate OOB policies such as with power (e.g., PWRBRK) or clocking method (e.g., REFCLK vs SRIS/SRNS), logging of the newly added peripheral device to confirm that it is on a "Supported Device List," validate configuration checking, etc. It shall be noted that one or more of these items may be a policy or policies that are included with the support checking at step 115 in FIG. 1.

In one or more embodiments, as a result of the change of status to unhidden, the methodology may proceed as typical hot-plug methods to make the peripheral device operational to the host. For example, the intermediary component 515 may send (210) a hot-plug alert (e.g., the intermediary component asserts a hot-plug interrupt) to the hot-plug controller that a new peripheral device is present. The hot-plug controller may then query (215) the intermediary component to obtain information about the peripheral device so that it can be made operational to the host. For example, the hot-plug controller 520 may query the side-band bus for the peripheral device's presence, and the intermediary component 515 presents this information to the host.

Depending upon the type of peripheral device, additional actions may be performed as needed to make the peripheral device functionally available. In the example used here for illustration purposes only, one or more data links may be trained (220). It shall be noted that different action (including no additional action) may be taken depending upon the system and peripheral device.

When functional or configured, a signal (e.g., a message signal interrupt (MSI)) may be sent (225) to the host operating system (OS) to recognize the new peripheral device. At this stage, the newly added peripheral device is operational/usable (230) by the overall host system.

3. Hot-Add Embodiment

FIG. 3 depicts a methodology for handling a hot-addable a peripheral device, according to embodiments of the present disclosure. In one or more embodiments, during reboot, the BMC has the opportunity to provide services after the devices are powered on but before POST/BIOS boot progresses to certain stages (e.g., the point of PCIe enumeration and device discovery/setup). A boot sequence may comprise interaction with the BIOS to pause boot after peripherals are energized but before other stages, which allows the BMC to provide early boot out-of-band operations.

In one or more embodiments, responsive to the peripheral device being determined by the BMC 510 to be supported but hot-addable (rather than hot-pluggable), the BMC waits (305) until the information handling system is turned off and then back on (i.e., power cycled). Responsive to the BMC detecting or receiving a power on request, the BMC causes (310) the status of the peripheral device to be changed from hidden to unhidden and enables management functions at a system management level, in like manner as described with reference to FIG. 2.

In one or more embodiments, the system power-up procedure continues and an interrupt is masked (315). Masking the interrupt signal for the added peripheral device causes the system to treat it as an existing device, which effectively it is. Thus, it will be configured and made available to the host OS like all other existing devices of the system.

Once again, depending upon the type of peripheral device, additional actions may be performed as needed to make the peripheral device functionally available. Continuing with the example used here for illustration purposes only, one or more data links may be trained (320) during the power on self test (POST). Training the data link may involve determining signal levels, impedance levels, and other values to have satisfactory performance for the data links. As note above with reference to FIG. 2, different action (including no action) may be taken depending upon the system and peripheral device.

Finally, in one or more embodiments, at the end of POST, the peripheral device is present (325) at start-up of the information handling system's operation system (OS), and the added peripheral device is now operational/usable (330) by the overall host system.

4. Hot-Removal Embodiments

Once a peripheral device has been added to an information handling system, it is functional and may remain in the system indefinitely. However, there may be instances in which the peripheral device is removed (whether deliberately or accidentally) from an operating information handling system. FIG. 4 depicts a methodology for handling the removal of a peripheral device from an information handling system, according to embodiments of the present disclosure.

As depicted in FIG. 4, in response to a peripheral device being disconnected from the information handling system that is operating, the intermediary component 515 changes (405) the peripheral device's status to indicate that it is unavailable/removed. In one or more embodiments, the intermediary component may change the status to hidden.

In one or more embodiments, the intermediary component 515 may send (410) a hot-plug interrupt signal to alert the information handling system's operating system that the identified peripheral device is no longer available (i.e., had been removed).

5. Intermediary Component Embodiments

Figure 6:
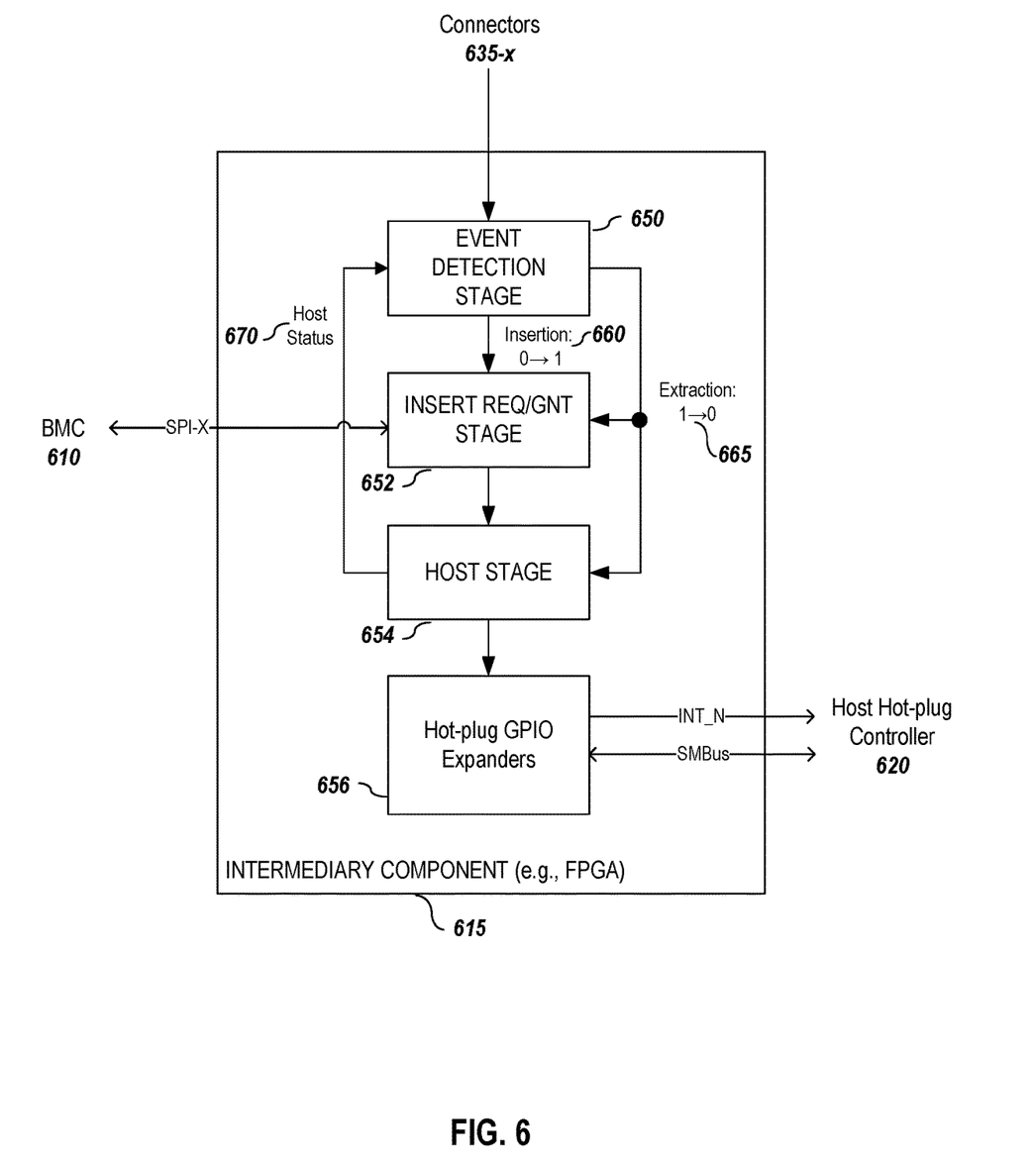
FIG. 6 depicts an intermediary component, according to embodiments of the present disclosure.

As noted above, an aspect of embodiments discussed above is the intermediary component. FIG. 6 depicts a functional diagram of an intermediary component, according to embodiments of the present disclosure. The depicted intermediary component embodiment 615 may be used in position of the intermediary component 515 in FIG. 5.

The depicted embodiment comprises several functional elements including, an event detection stage 650, an insert requests/grant stage 652, a host stage 654, and hot-plug general purpose I/O (GPIO) expanders 656. Additional elements may be present.

In one or more embodiments, the intermediary component 615 may be implemented as a field programmable gate array (FPGA). Some benefits of implementing the intermediary component 515/615 as an FPGA include (but are not limited to): cost, flexibility, ease to implement, and ability to add this functionality to existing systems that have an FPGA.

Figure 7:
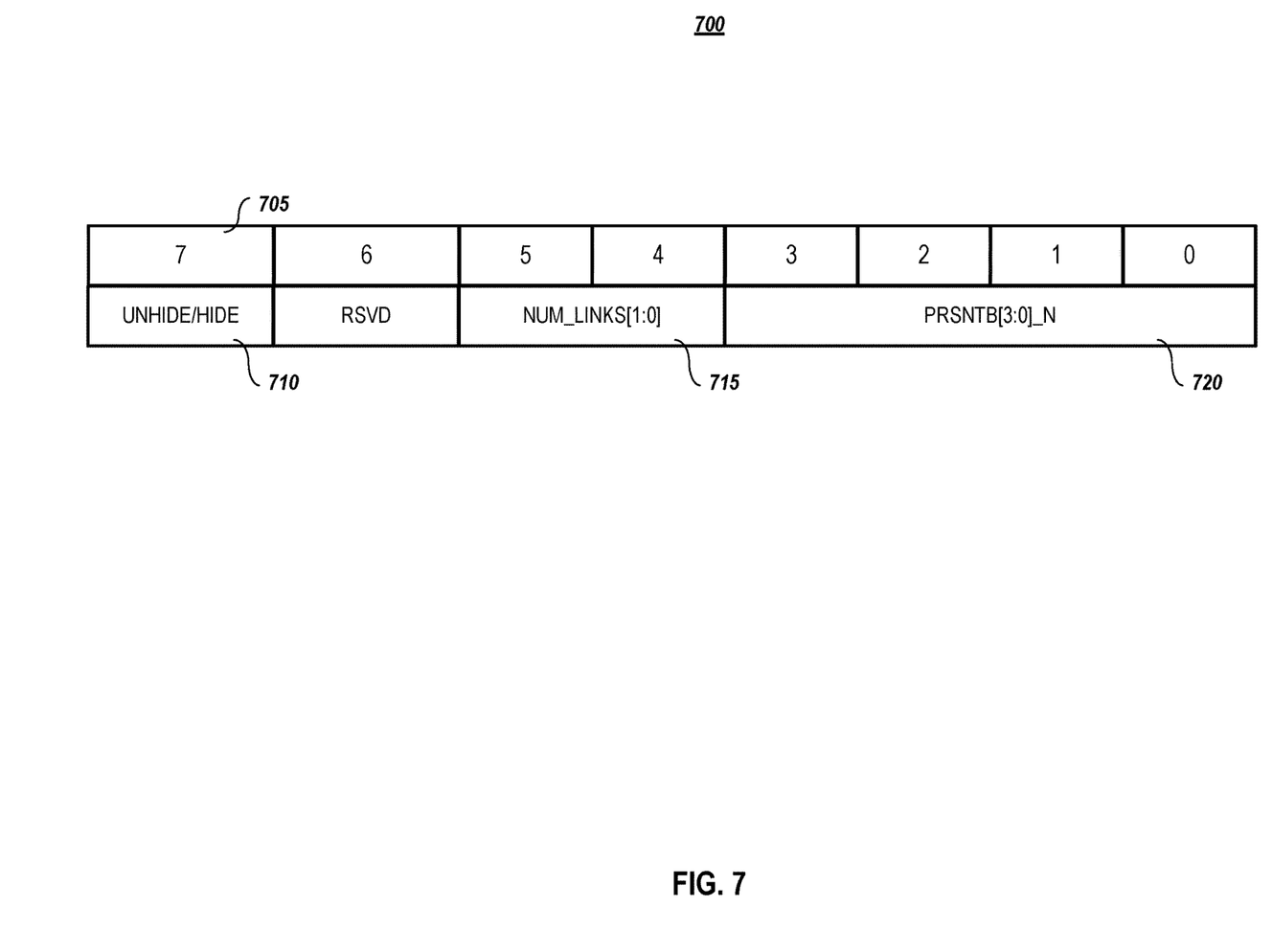
FIG. 7 depicts an example device register for a peripheral device, according to embodiments of the present disclosure.

In the depicted embodiment, the event detection stage 650 receives a signal from a connector 635 when a peripheral device is inserted into the connector. In one or more embodiments, the event detection stage may send an insertion signal 660 to the insert request/grant stage 652, which may create a data entry to record the newly inserted pluggable. FIG. 7 depicts an example device register associated with a peripheral device, according to embodiments of the present disclosure. The depicted register 700 comprises a number of fields associated with peripheral device that has been newly inserted into a connector. In one or more embodiments, one of the fields (in this example, field or bit 7) indicates whether the peripheral device is hidden from the host system. In one or more embodiments, either the event detection module or the insert request/grant stage module initially sets that field to "hidden."

In one or more embodiments, the BMC 610 may poll on a presence (e.g., single-bit) of the device or receive an alert, wherein the presence pins/status is made available to the BMC in the intermediary component through an interface bus and address space that is also accessible by the host hot-plug controller 620. When the BMC detects that a device is present that was previously not present, the BMC may apply one or more policies to determine whether the peripheral device is supported. For example, the BMC may query the thermal tier and number of controllers/links via a sideband interface. Assuming the peripheral device can be supported, the BMC may write data to the intermediary component (e.g., to the register maintained by the insert request/grant stage 652) to include PRESENCE (e.g., multi-bit 720 in FIG. 7) and NUM_LINKS (e.g., field 715 in FIG. 7). When the peripheral device is authorized for system use, the BMC sets an UNHIDE indicator in the same register (e.g., setting bit 7 (710) in FIGS. 7 to 1, where 1=UNHIDE).

In one or more embodiments, the BMC may communicate additional device purposing and bifurcation requirements (e.g., 527 in FIG. 5) to the host BIOS to handle the addition of the new peripheral device.

In one or more embodiments, when the UNHIDE indicator is set, the insert request/grant stage 652 may present the information about the peripheral device to the hot-plug ports (e.g., SMBus GPIO Expander 656). In one or more embodiments, the hot-plug port asserts an interrupt because the GPIO expander input signals have changed state since the last time they were queried, and the hot-plug controller 620 and the host configure the upstream root port and begin link training. When training is successful, the operating system is notified that a new device is present in the system.

In one or more embodiments, the intermediary component 615 may autonomously alert (i.e., not involve the BMC 610) when the peripheral device is removed. Note that logic of the immediate component 615 handles removal events without BMC involvement by, in part, providing a by-pass for an extraction detection event 665, which notifies the host stage 654 and starts a typical removal process. Such embodiments help minimize host notification latency.

C. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 8:
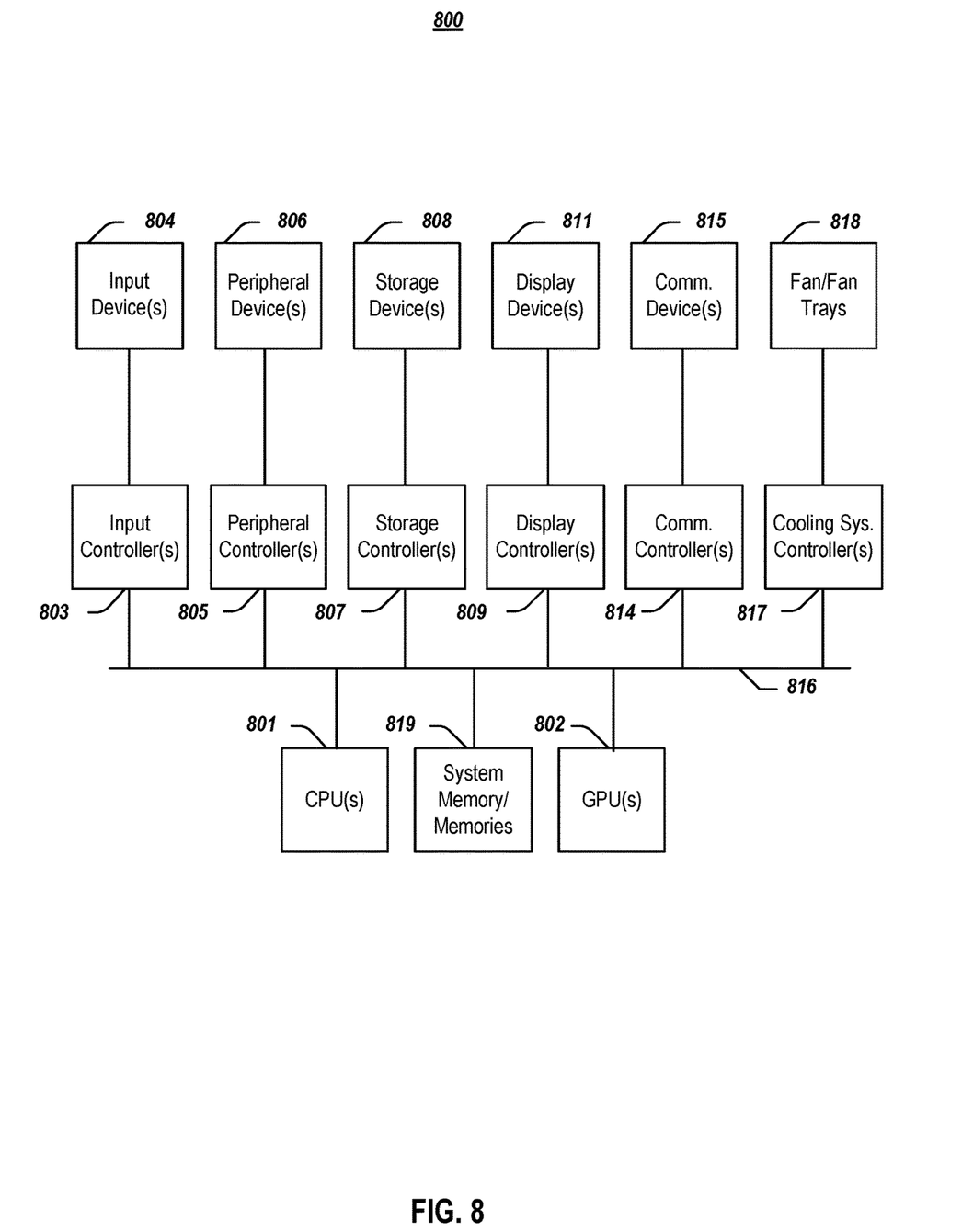
FIG. 8 depicts a simplified block diagram of an information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more CPUs 801 that provides computing resources and controls the computer. CPU 801 may be implemented with a microprocessor or the like and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804, such as a keyboard, mouse, touchscreen, stylus, microphone, camera, trackpad, display, etc. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 9:
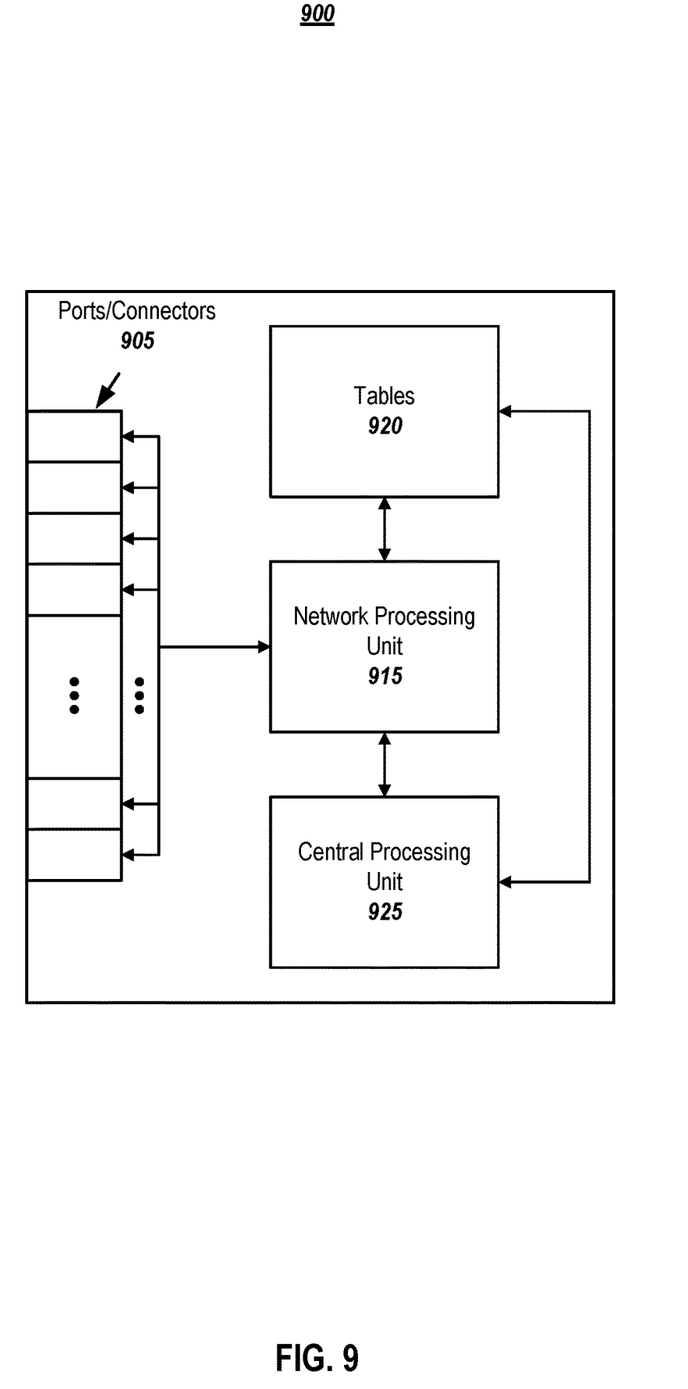
FIG. 9 depicts an alternative block diagram of an information handling system, according to embodiments of the present disclosure.

FIG. 9 depicts an alternative block diagram of an information handling system, according to embodiments of the present disclosure. It will be understood that the functionalities shown for system 900 may operate to support various embodiments of the present disclosure—although it shall be understood that such system may be differently configured and include different components, additional components, or fewer components.

The information handling system 900 may include a plurality of I/O ports or connectors 905, a network processing unit (NPU) 915, one or more tables 920, and a CPU 925. Additional or different connectors may be present, which are not depicted. The system includes a power supply (not shown) and may also include other components, which are not shown for sake of simplicity.

In one or more embodiments, the I/O ports 905 may be connected via one or more cables to one or more other network devices or clients. The network processing unit 915 may use information included in the network data received at the node 900, as well as information stored in the tables 920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for handling a peripheral device comprising:
    responsive to a peripheral device being connected to an information handling system that is operating, setting, using an intermediary component that receives a signal that the peripheral device has been connected to the information handling system, a status of the peripheral device to hidden so that its presence is not detected by a hot-plug controller of the information handling system;
    responsive to a baseboard management controller (BMC) recognizing that a peripheral device has been being connected to the information handling system, using one or more policies to determine whether the peripheral device is supported by the information handling system;
    responsive to determining that the peripheral device is supported and is hot-pluggable, the BMC performing steps comprising:
        causing the status of the peripheral device to be changed from hidden to unhidden, which causes the hot-plug controller to be alerted, via the intermediary component, that the peripheral device is present so that the peripheral device can be made operational to the information handling system; and
        enabling one or more management functions to support the peripheral device at a system management level; and
    responsive to determining that the peripheral device is supported and hot-addable, performing steps comprising:
        taking no action regarding the peripheral device until the information handling system is restarted; and
        responsive to receiving a power on request:
            causing the status of the peripheral device to be changed from hidden to unhidden, which causes the hot-plug controller to be alerted that the peripheral device is present so that the peripheral device can be made operational to the information handling system when the information handling system's operation system finishes booting; and
            enabling management functions to support the peripheral device at a system management level.

2. The method of claim 1 wherein:
    responsive to the BMC determining that the peripheral device is not supported by the information handling system, performing steps comprising:
        keeping the status of the peripheral device as hidden; and
        causing an alert that an unsupported peripheral device has been connected to the information handling system.

3. The method of claim 1 wherein:
    the intermediary component supports receiving an Open Compute Platform (OCP) peripheral device, which can supply ambiguous data.

4. The method of claim 1 wherein the BMC recognizes that the peripheral device has been being connected to the information handling system by:
    receiving an interrupt signal from the intermediary component; or
    polling the intermediary component.

5. The method of claim 1 wherein the step of changing the status of the peripheral device from hidden to unhidden comprises:
    causing a register field to be changed to indicate that peripheral device is not hidden or present.

6. The method of claim 1 wherein:
    the BMC and the intermediary component are integrated into a single component.

7. The method of claim 1 further comprising:
    responsive to the peripheral device being removed while the information handling system is operating, performing steps comprising:
        changing the status of the peripheral device to indicate that it is unavailable; and
        sending a hot-plug interrupt signal to alert the information handling system's operating system that the peripheral device is unavailable.

8. The method of claim 1 wherein the step of enabling management functions to support the peripheral device at a system management level comprises one or more of:
    determining power budgeting or allocation;
    setting peripheral device firmware update; and
    setting one or more out-of-band policies.

9. The method of claim 1 wherein the one or more policies comprise one or more of:
    determining whether the peripheral device meets a security requirement or requirements;
    determining whether support of the peripheral device exceed a power level or levels;

determining whether support of the peripheral device exceed a thermal level or levels;
determining whether the peripheral device is included on a disallowed list; and
determining whether a set of system requirements are available for the peripheral device.

10. An information handling system comprising:
one or more processors for supporting an operating system of the information handling system;
a connector for receiving a peripheral device;
an intermediary component, communicatively coupled to the connector, that receives one or more signals in response to a peripheral device connecting to the connector and initially sets a status of the peripheral device to hidden so that its presence is not detected by a hot-plug controller of the information handling system;
a baseboard management controller (BMC), communicatively coupled to the intermediary component, that:
responsive to the BMC receiving from the intermediary component an indication that the peripheral device has been being connected to the information handling system, uses one or more policies to determine whether the peripheral device is supported by the information handling system;
responsive to determining that the peripheral device is supported and is hot-pluggable, performs steps comprising:
causing the status of the peripheral device to be changed from hidden to unhidden, which causes the hot-plug controller to be alerted that the peripheral device is present so that the peripheral device can be made operational to the operating system of the information handling system; and
enabling one or more management functions to support the peripheral device at a system management level; and
responsive to the BMC determining that the peripheral device is supported and hot-addable, perform steps comprising:
taking no action regarding the peripheral device until the information handling system is restarted; and
responsive to receiving a power on request:
causing the status of the peripheral device to be changed from hidden to unhidden, which causes the hot-plug controller to be alerted that the peripheral device is present so that the peripheral device can be made operational to the information handling system when the information handling system's operation system finishes booting; and
enabling management functions to support the peripheral device at a system management level; and
the hot-plug controller, communicatively coupled to the intermediary component, that:
responsive to receiving notification of the peripheral device being present, causes the peripheral device to be operational and notifies the operating system that the peripheral device is present.

11. The information handling system of claim 10 wherein the intermediary component is a field programmable gate array (FPGA).

12. The information handling system of claim 10 wherein the BMC is further configured to, responsive to determining that the peripheral device is not supported by the information handling system, perform steps comprising:
keeping the status of the peripheral device as hidden; and
causing an alert that an unsupported peripheral device has been connected to the information handling system.

13. The information handling system of claim 10 wherein the BMC is further configured to comprise the intermediary component.

14. The information handling system of claim 10 wherein the intermediary component is further configured to, responsive to the peripheral device being removed while the information handling system is operating, perform steps comprising:
changing the status of the peripheral device to indicate that it is unavailable; and
causing a hot-plug interrupt signal to be sent so that the information handling system's operating system is alerted that the peripheral device is unavailable.

15. A method comprising:
responsive to an intermediary component of an information handling system detecting a connection of a peripheral device to the information handling system, setting a status of the peripheral device to hidden so that the peripheral device's presence is not detected by a hot-plug controller of the information handling system;
determining, using a baseboard management controller (BMC) and a set of one or more policies, whether to keep the presence of the peripheral device hidden or unhidden from the hot-plug controller;
responsive to the BMC determining that the peripheral device is supported, causing the peripheral device to be unhidden and made accessible by the hot-plug controller of the information handling system, wherein responsive to determining that the peripheral device is supported and hot-addable, performing steps comprising:
taking no action regarding the peripheral device until the information handling system is restarted; and
responsive to receiving a power on request:
causing the status of the peripheral device to be changed from hidden to unhidden, which causes the hot-plug controller to be alerted that the peripheral device is present so that the peripheral device can be made operational to the information handling system when the information handling system's operation system finishes booting; and
enabling management functions to support the peripheral device at a system management level; and
responsive to the BMC determining that the peripheral device is not supported, causing the peripheral device to remain hidden from the hot-plug controller of the information handling system.

16. The method of claim 15 wherein the step of responsive to the BMC determining that the peripheral device is supported, causing the peripheral device to be unhidden and made accessible by the hot-plug controller of the information handling system comprises:
determining whether the peripheral device is hot-pluggable or hot-addable.

17. The method of claim 16 further comprising:
responsive to determining that the peripheral device is supported and is hot-pluggable, the BMC performing steps comprising:
causing the status of the peripheral device to be changed from hidden to unhidden, which causes the hot-plug controller to be alerted that the peripheral device is present so that the peripheral device can be made operational to the information handling system; and enabling one or more management functions to support the peripheral device at a system management level.

18. The method of claim 16 wherein the BMC and the intermediary component are a single functional component.

19. The method of claim 15 further comprising:
responsive to the peripheral device being removed while the information handling system is operating, performing steps comprising:
changing the status of the peripheral device to indicate that it is unavailable; and
causing a hot-plug interrupt signal to be made to alert the information handling system's operating system that the peripheral device is unavailable.

20. The method of claim 19 wherein the steps of changing the status and causing the hot-plug interrupt signal to be made are performed by the intermediary component.

* * * * *